(12) United States Patent
Kobayashi

(10) Patent No.: US 8,494,839 B2
(45) Date of Patent: Jul. 23, 2013

(54) APPARATUS, METHOD, AND RECORDING MEDIUM FOR MORPHOLOGICAL ANALYSIS AND REGISTERING A NEW COMPOUND WORD

(75) Inventor: Kenichiro Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 616 days.

(21) Appl. No.: 12/121,620

(22) Filed: May 15, 2008

(65) Prior Publication Data

US 2008/0288243 A1 Nov. 20, 2008

(30) Foreign Application Priority Data

May 16, 2007 (JP) ................................ P2007-130387

(51) Int. Cl.
*G06F 17/21* (2006.01)
*G06F 17/27* (2006.01)
*G06F 17/20* (2006.01)

(52) U.S. Cl.
USPC ...................................... 704/10; 704/1; 704/9

(58) Field of Classification Search
None
See application file for complete search history.

(56) References Cited

U.S. PATENT DOCUMENTS

| | | | |
|---|---|---|---|
| 5,323,316 A * | 6/1994 | Kadashevich et al. | 704/9 |
| 5,442,547 A * | 8/1995 | Kutsumi et al. | 704/7 |
| 5,867,812 A * | 2/1999 | Sassano | 704/10 |
| 5,946,648 A * | 8/1999 | Halstead et al. | 704/9 |
| 5,963,893 A * | 10/1999 | Halstead et al. | 704/9 |
| 6,035,268 A * | 3/2000 | Carus et al. | 704/9 |
| 6,754,617 B1 * | 6/2004 | Ejerhed | 704/9 |
| 7,421,386 B2 * | 9/2008 | Powell et al. | 704/10 |
| 7,478,036 B2 * | 1/2009 | Shen et al. | 704/9 |
| 7,555,428 B1 * | 6/2009 | Franz et al. | 704/10 |
| 7,610,189 B2 * | 10/2009 | Mackie | 704/9 |

FOREIGN PATENT DOCUMENTS

| | | |
|---|---|---|
| JP | 05-257969 | 10/1993 |
| JP | 06-019959 | 1/1994 |
| JP | 2002-258884 | 9/2002 |
| JP | 2002-259426 | 9/2002 |

OTHER PUBLICATIONS

E. Zackova, et al., "Recognition and Tagging of Compound Verb Groups in Czech", Proceedings of CoNLL-2000 and LLL-2000, pp. 219-225 (2000).

P. Nakov, et al., "Guessing Morphological Classes of Unknown German Nouns", Recent Advances in Natural Language Processing, 8 pages. (2003).

J. Kim, et al., "A Corpus-Based Learning Method of Compound Noun Indexing Rules for Korean", Information Retrieval, 4, pp. 115-132 (2001).

(Continued)

*Primary Examiner* — Jesse Pullias
(74) *Attorney, Agent, or Firm* — Finnegan, Henderson, Farabow, Garrett & Dunner, L.L.P.

(57) ABSTRACT

Disclosed herein is an information processing apparatus for analyzing text data, including: acquisition means for acquiring the text data; morpheme information registration means for registering morpheme information for use in analyzing the text data morphologically; morphological analysis means for analyzing the text data acquired by the acquisition means; compound word processing rule registration means for registering compound word processing rules for creating a compound word not registered in the morpheme information registration means; and compound word processing means, by use of the compound word processing rules registered in the compound word processing rule registration means, for combining the morphemes included in the morphological analysis information created by the morphological analysis means, into the compound word not registered in the morpheme information registration means and detecting the created compound word.

14 Claims, 8 Drawing Sheets

OTHER PUBLICATIONS

European Communication in Application No. 08 251 454.8 dated Nov. 28, 2012, 7 pages.

Nenadic, G at al., "Recognition and Acquisition of Compound Names from Corpora", NLP 2000, LNCS 1835, pp. 38-48 (2000), 11 pages.

* cited by examiner

FIG.5

| CHARACTER STRING | PART OF SPEECH | READING | COMPOUND |
|---|---|---|---|
| AAA | PROPER NOUN | AAA | ‥ |
| STOCK COMPANY | COMMON NOUN | KABUSHIKI-GAISHA | COMPOUND |
| PRESIDENT | COMMON NOUN | SHACHOU | ‥ |
| OF | PARTICLE | NO | ‥ |
| GREETINGS | SA-ROW IRREGULAR CONJUGATION NOUN | AISATSU | ‥ |
| ⋮ | ⋮ | ⋮ | |

FIG.6

```
...
(NOUN, *)(NOUN,"STOCK COMPANY")=PROPER NOUN
(NOUN, *)(NOUN,"PRESIDENT")=PROPER NOUN
(NOUN, *)(NOUN,"FIRST BASEMAN")=PROPER NOUN
...
```

FIG.7

| CHARACTER STRING | PART OF SPEECH | READING |
|---|---|---|
| AAA STOCK COMPANY | PROPER NOUN | KABUSHIKIGAISHASHACHOU |
| OF | PARTICLE | NO |
| GREETINGS | SA-ROW IRREGULAR CONJUGATION NOUN | AISATSU |

FIG.8

| CHARACTER STRING | PART OF SPEECH | READING |
|---|---|---|
| AAA | PROPER NOUN | AAA |
| STOCK | COMMON NOUN | KABUSHIKI |
| COMPANY | COMMON NOUN | GAISHA |
| PRESIDENT | COMMON NOUN | SHACHOU |
| OF | PARTICLE | NO |
| GREETINGS | SA-ROW IRREGULAR CONJUGATION NOUN | AISATSU |

APPARATUS, METHOD, AND RECORDING MEDIUM FOR MORPHOLOGICAL ANALYSIS AND REGISTERING A NEW COMPOUND WORD

CROSS REFERENCES TO RELATED APPLICATIONS

The present invention contains subject matter related to Japanese Patent Application JP 2007-130387 filed with the Japan Patent Office on May 16, 2007, the entire contents of which being incorporated herein by reference.

BACKGROUND OF THE INVENTION

1. Field of the Invention

The present invention relates to an information processing apparatus, an information processing method, a program, and a recording medium. More particularly, the invention relates to an information processing apparatus, an information processing method, a program, and a recording medium suitable for analyzing texts in electronic form.

2. Description of the Related Art

Generally, morphological analysis involves dividing texts written in natural language into morphemes that are the units of linguistic significance and thereby providing morpheme-by-morpheme information (e.g., parts of speech). This analysis is one of the basic techniques for natural language processing and has been practiced extensively.

In the traditional morphological analysis, the words registered in the word dictionary were the units of morphemes. Two functions were basically absent: the function of determining a compound word using the relations between a plurality of morphemes; and the function of segmenting into a plurality of morphemes any one of the words registered as compound words in the dictionary.

If it was desired to extract from the dictionary any registered compound word in the form of segmented words, it was necessary to register in advance the component units making up that compound word in the dictionary, or to register beforehand the most significant of the words constituting the compound word in question (e.g., see Japanese Patent Laid-Open No. 2002-259426).

SUMMARY OF THE INVENTION

If each and every compound word were to be registered in the dictionary in association with the segmented words that make up the word in question as mentioned above, the dictionary would be bound to become inordinately bulky in capacity. Furthermore, the increasing number of registered words would render the maintenance of the word dictionary progressively difficult.

Because the usual morphological analysis did not have the function of determining any compound word using the relations between a plurality of morphemes, a facility unrelated to morphological analysis was devised to perform such analyses as syntactic analysis and dependency analysis on the result of morphological analysis in order to determine the compound word of interest based on the relations between a plurality of morphemes.

Word information associated with the morphemes derived from morphological analysis is registered in the dictionary. In the past, the results of syntactic analysis and dependency analysis aside from morphological analysis might be arranged to include information about syntax and dependency but could not be furnished with information about compound words as morphemes.

For example, suppose that a sentence including a term "AAA stock company" (AAA is a proper noun expressing the name of the company) is subjected to morphological analysis. In the traditional morphological analysis, there are two possible results. If the term "AAA stock company" has been registered as a proper noun in the dictionary, then the analysis yields "AAA stock company" (proper noun). If the term "AAA stock company" is not registered as a proper noun in the dictionary, then the term is divided illustratively into "AAA" (proper noun) and "stock company" (common noun); or into "AAA" (proper noun), "stock company" (common noun), and "company" (common noun).

When the term "AAA stock company" (proper noun) not found registered in the dictionary is divided into either "AAA" (proper noun) and "stock company" (common noun); or into "AAA" (proper noun), "stock" (common noun), and "company" (common noun), these results of morphological analysis are subjected to other processes such as syntactic analysis and dependency analysis, whereby the compound word "AAA stock company" is detected. However, the processing has failed to provide the acquired compound term with such word information as part of speech or reading.

As described above, the ordinary morphological analysis is significantly affected by the words registered as the units in the dictionary. It is difficult to acquire information about any morphemes smaller than the registered units in the dictionary or to obtain information about any compound words that may be created through combinations of morphemes.

The present invention has been made in view of the above circumstances and provides arrangements for acquiring the results of analysis other than the words registered in the dictionary.

In carrying out the present invention and according to a first embodiment thereof, there is provided an information processing apparatus for analyzing text data, including: acquisition means for acquiring the text data; morpheme information registration means for registering morpheme information for use in analyzing the text data morphologically; morphological analysis means for analyzing the text data acquired by the acquisition means in accordance with the morpheme information registered by the morpheme information registration means, thereby creating morphological analysis information in the form of a table of morphemes constituting the text data; compound word processing rule registration means for registering compound word processing rules for creating a compound word not registered in the morpheme information registration means; and compound word processing means, by use of the compound word processing rules registered in the compound word processing rule registration means, for combining the morphemes included in the morphological analysis information created by the morphological analysis means, into the compound word not registered in the morpheme information registration means and detecting the created compound word.

Preferably, the compound word processing rules registered in the compound word processing rule registration means may designate conditions for the words to be included in the compound word combined from a plurality of adjacent words.

Preferably, the compound word processing rules registered in the compound word processing rule registration means may include descriptions for furnishing the compound word combined from a plurality of words with at least one of information items made up of part of speech, reading, and word cost.

Preferably, the information processing apparatus practiced as the first embodiment of the present invention may further include output means for outputting the morphological analysis information created by the morphological analysis means, as well as the compound word detected by the compound word processing means.

Preferably, the information processing apparatus as the first embodiment may further include segmented morpheme extraction means for further analyzing the morphemes included in the morphological analysis information created by the morphological analysis means in accordance with the morpheme information registered in the morpheme information registration means, thereby extracting segmented morphemes from the morphemes.

Preferably, the information processing apparatus as the first embodiment may further include output means for outputting the morphological analysis information created by the morphological analysis means, the compound word detected by the compound word processing means, and the segmented morphemes extracted by the segmented morpheme extraction means.

Preferably, the morpheme information registered in the morpheme information registration means may include information about whether the morpheme of interest is a compound word; wherein the morphological analysis means may incorporate, in the morphological analysis information, information about whether each of the morphemes constituting the text data in the form of a table in the morphological analysis information is registered as a compound word in the morpheme information registration means; and wherein the segmented morpheme extraction means may extract the segmented morphemes constituting the morpheme of interest if the morpheme is found registered as a compound word in the morpheme information registration means upon reference to the morphological analysis information.

According to a second embodiment of the present invention, there is provided an information processing method for use with an information processing apparatus for analyzing text data, the information processing method including the steps of: acquiring the text data; analyzing the acquired text data in accordance with dictionary data for morphologically analyzing the text data; creating morphological analysis information in the form of a table of morphemes constituting the text data, in accordance with results of the analysis; and by use of compound word processing rules for creating a compound word not registered in the dictionary data, combining the morphemes included in the morphological analysis information into the compound word not registered in the dictionary data and detecting the created compound word.

According to a third embodiment of the present invention, there is provided a program for causing a computer to carry out a procedure for analyzing text data, the procedure including the steps of: acquiring the text data; analyzing the acquired text data in accordance with dictionary data for morphologically analyzing the text data; creating morphological analysis information in the form of a table of morphemes constituting the text data, in accordance with results of the analysis; and by use of compound word processing rules for creating a compound word not registered in the dictionary data, combining the morphemes included in the morphological analysis information into the compound word not registered in the dictionary data and detecting the created compound word.

Where the first, the second, or the third embodiment of the present invention outlined above is in use, text data is first acquired. The acquired text data is analyzed in accordance with dictionary data for morphologically analyzing the text data. Morphological analysis information is then created in the form of a table of morphemes constituting the text data, in accordance with results of the analysis. By use of compound word processing rules for creating a compound word not registered in the dictionary data, the morphemes included in the morphological analysis information are combined into the compound word not registered in the dictionary data, and the created compound word is detected.

According to a fourth embodiment of the present invention, there is provided an information processing apparatus for analyzing text data, including: acquisition means for acquiring the text data; morpheme information registration means for registering morpheme information for use in analyzing the text data morphologically; morphological analysis means for analyzing the text data acquired by the acquisition means in accordance with the morpheme information registered by the morpheme information registration means, thereby creating morphological analysis information in the form of a table of morphemes constituting the text data; and segmented morpheme extraction means for further analyzing the morphemes included in the morphological analysis information created by the morphological analysis means, in accordance with the morpheme information registered in the morpheme information registration means, thereby extracting segmented morphemes from the morphemes.

According to a fifth embodiment of the present invention, there is provided an information processing method for use with an information processing apparatus for analyzing text data, the information processing method including the steps of: acquiring the text data; analyzing the acquired text data in accordance with dictionary data for morphologically analyzing the text data; creating morphological analysis information in the form of a table of morphemes constituting the text data in accordance with results of the analysis; and further analyzing the morphemes included in the morphological analysis information in accordance with the dictionary information, thereby extracting segmented morphemes from the morphemes.

According to a sixth embodiment of the present invention, there is provided a program for causing a computer to carry out a procedure for analyzing text data, the procedure including the steps of: acquiring the text data; analyzing the acquired text data in accordance with dictionary data for morphologically analyzing the text data; creating morphological analysis information in the form of a table of morphemes constituting the text data in accordance with results of the analysis; and further analyzing the morphemes included in the morphological analysis information in accordance with the dictionary information, thereby extracting segmented morphemes from the morphemes.

Where the fourth, the fifth, or the sixth embodiment of the present invention outlined above is in use, text data is first acquired. The acquired text data is analyzed in accordance with dictionary data for morphologically analyzing the text data. Morphological analysis information is then created in the form of a table of morphemes constituting the text data in accordance with results of the analysis. The morphemes included in the morphological analysis information are further analyzed in accordance with the dictionary information, whereby segmented morphemes are extracted from the morphemes.

In the description that follows, the term "network" will refer to a setup that connects at least two apparatuses in a manner enabling one apparatus to send information to the other apparatus. The apparatuses communicating with one another through the network may either be independent of one another or constitute internal blocks that form a single piece of equipment.

In the ensuing description, the term "communication" will refer to arrangements that function wirelessly or in wired fashion. The arrangements may alternatively work in a manner in which wired communications performed in one zone are taken over by wireless communications in another zone. The arrangements may further work in such a manner that one apparatus communicates in wired fashion with another apparatus which in turn communicates wirelessly with yet another apparatus, and so on.

The information processing apparatus for analyzing text data may be one which performs processes in addition to those for text data analysis. The apparatus may be an independently established piece of equipment or may be constituted by a plurality of pieces of equipment for carrying out processes including those for analyzing text data.

According to the first, the second, or the third embodiment of the present invention outlined above, text data may be analyzed. In particular, morphemes may be combined into an unregistered compound word that can then be detected.

According to the fourth, the fifth, or the sixth embodiment of the present invention outlined above, text data may also be analyzed. In particular, morphemes may be further analyzed in order to extract segmented morphemes therefrom.

BRIEF DESCRIPTION OF THE DRAWINGS

Further objects and advantages of the present invention will become apparent upon a reading of the following description and appended drawings in which:

FIG. 5 is a tabular view explanatory of morphological analysis information;

FIG. 6 is a schematic view explanatory of compound word processing rules;

FIG. 7 is a tabular view explanatory of compound word analysis information;

FIG. 8 is a tabular view explanatory of segmented morpheme information;

DETAILED DESCRIPTION OF THE PREFERRED EMBODIMENTS

What is described below as the preferred embodiments of the present invention with reference to the accompanying drawings corresponds to the appended claims as follows: the description of the preferred embodiments basically provides specific examples supporting what is claimed. If any example of the invention described below as a preferred embodiment does not have an exactly corresponding claim, this does not means that the example in question has no relevance to the claims. Conversely, if any example of the invention depicted hereunder has a specifically corresponding claim, this does not mean that the example in question is limited to that claim or has no relevance to other claims.

Figure 4:
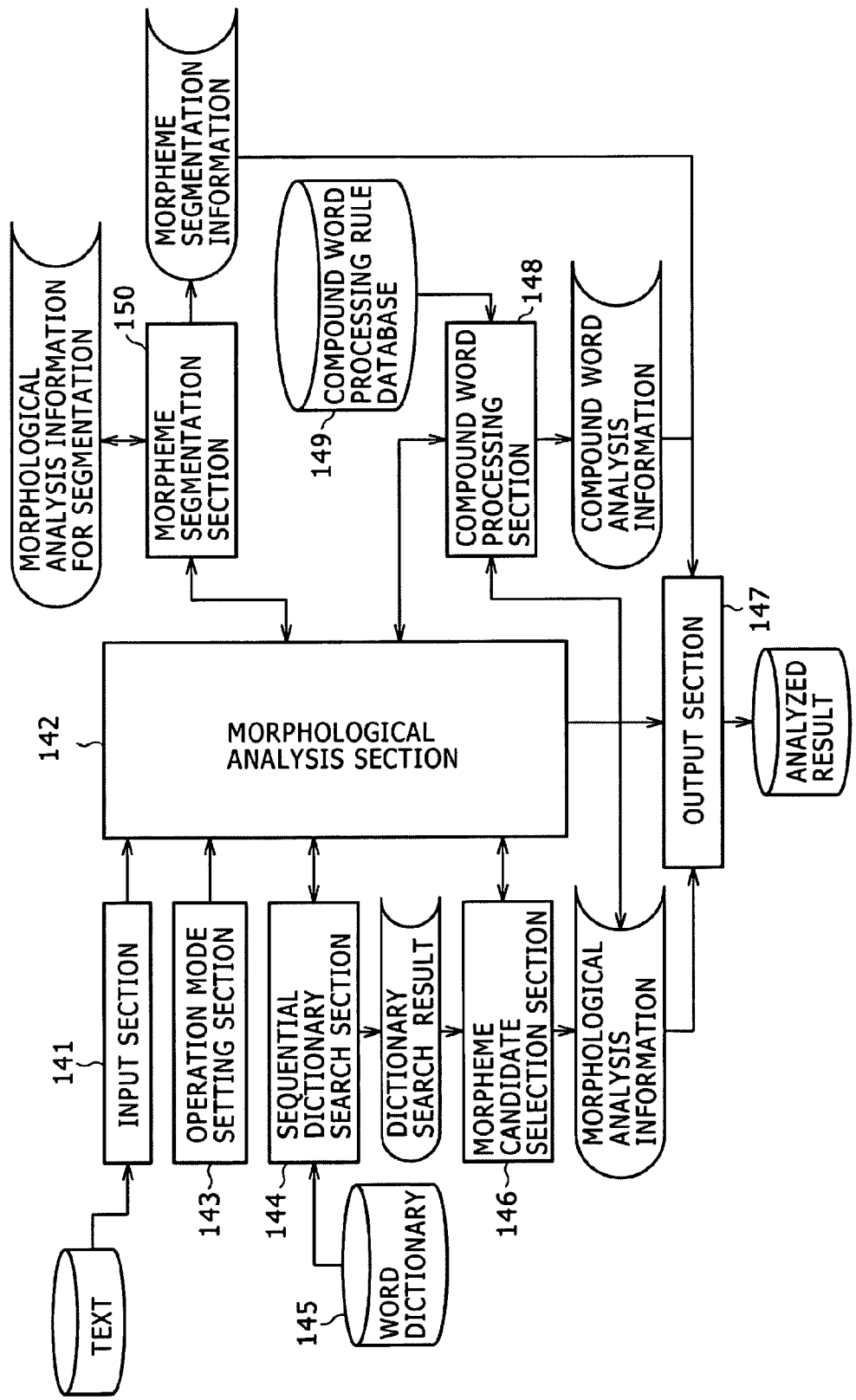
FIG. 4 is a functional block diagram showing functional blocks that are implemented when a morphological analysis application is started and carried out.

One embodiment of the present invention is an information processing apparatus for analyzing text data, including: acquisition means (e.g., input section 141 in FIG. 4) for acquiring the text data; morpheme information registration means (e.g., word dictionary 145 in FIG. 4) for registering morpheme information for use in analyzing the text data morphologically; morphological analysis means (e.g., sequential dictionary search section 144 and morpheme candidate selection section 146 in FIG. 4) for analyzing the text data acquired by the acquisition means in accordance with the morpheme information registered by the morpheme information registration means, thereby creating morphological analysis information in the form of a table of morphemes constituting the text data; compound word processing rule registration means (e.g., compound word processing rule database 149 in FIG. 4) for registering compound word processing rules (e.g., information shown in FIG. 6) for creating a compound word not registered in the morpheme information registration means; and compound word processing means (e.g., compound word processing section 148 in FIG. 4), by use of the compound word processing runes registered in the compound word processing rule registration means, for combining the morphemes included in the morphological analysis information created by the morphological analysis means, into the compound word not registered in the morpheme information registration means and detecting the created compound word.

Preferably, the compound word processing rules registered in the compound word processing rule registration means may designate conditions for the words to be included in the compound word combined from a plurality of adjacent words (e.g., a condition specifying that the first word of a compound word be an undefined noun and the second word thereof be a common noun "president").

Preferably, the compound word processing rules registered in the compound word processing rule registration means may include descriptions for furnishing the compound word combined from a plurality of words with at least one of information items made up of part of speech, reading, and word cost (e.g., a description saying that if the condition specifying that the first word of a compound word be an undefined noun and the second word thereof be a common noun "president" is met, then the part of speech of the compound word in question is a proper noun).

Preferably, the information processing apparatus practiced as the first embodiment of the present invention may further include output means (e.g., output section 147 in FIG. 4) for outputting the morphological analysis information created by the morphological analysis means, as well as the compound word detected by the compound word processing means.

Preferably, the information processing apparatus as the first embodiment may further include segmented morpheme extraction means (e.g., morpheme segmentation section 150 in FIG. 4) for further analyzing the morphemes included in the morphological analysis information created by the morphological analysis means in accordance with the morpheme information registered in the morpheme information registration means, thereby extracting segmented morphemes from the morphemes.

Preferably, the information processing apparatus as the first embodiment may further include output means (e.g., output section 147 in FIG. 4) for outputting the morphological analysis information created by the morphological analysis means, the compound word detected by the compound word processing means, and the segmented morphemes extracted by the segmented morpheme extraction means.

Preferably, the morpheme information registered in the morpheme information registration means may include information about whether the morpheme of interest is a compound word; wherein the morphological analysis means may incorporate, in the morphological analysis information, information about whether each of the morphemes constituting the text data in the form of a table in the morphological analysis information is registered as a compound word in the morpheme information registration means; and wherein the segmented morpheme extraction means may extract the segmented morphemes constituting the morpheme of interest if the morpheme is found registered as a compound word in the morpheme information registration means upon reference to the morphological analysis information.

Figure 9:
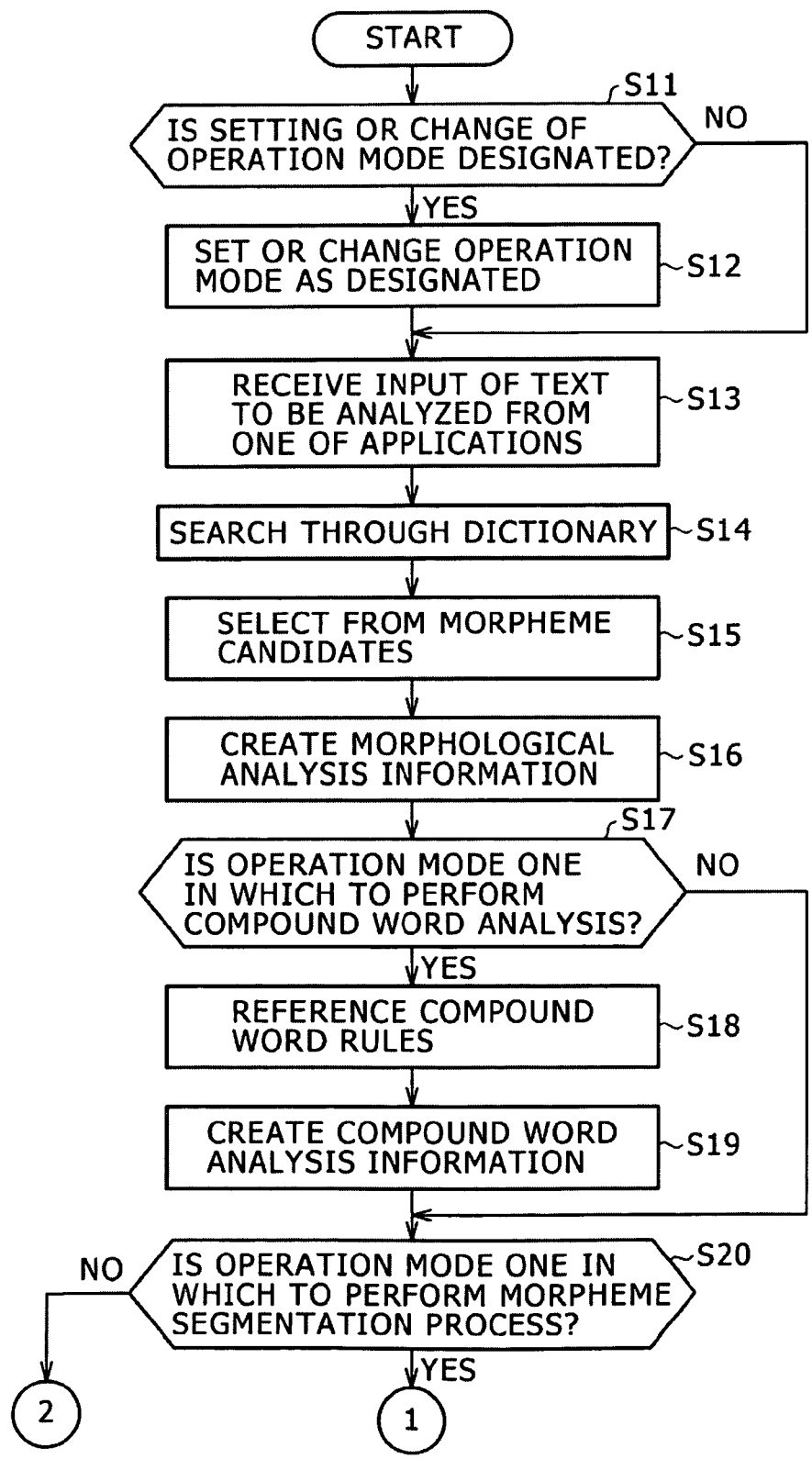
FIG. 9 is a flowchart of steps in which morphological analysis is performed.

Another embodiment of the present invention is an information processing method for use with an information processing apparatus for analyzing text data, the information processing method including the steps of: acquiring (e.g., in step S13 of FIG. 9) the text data; analyzing (e.g., in steps S14 and S15 of FIG. 9) the acquired text data in accordance with dictionary data (e.g., information registered in the word dictionary 145 in FIG. 4) for morphologically analyzing the text data; creating (e.g., in step S16 of FIG. 9) morphological analysis information in the form of a table of morphemes constituting the text data, in accordance with results of the analysis; and by use of compound word processing rules (e.g., information shown in FIG. 6 and registered in the compound word processing rule database 149 in FIG. 4) for creating a compound word not registered in the dictionary data, combining the morphemes included in the morphological analysis information into the compound word not registered in the dictionary data and detecting the created compound word (e.g., in steps S18 and S19 of FIG. 9).

A further embodiment of the present invention is a computer to carry out a procedure for analyzing text data, the procedure including the steps of: acquiring (e.g., in step S13 of FIG. 9) the text data; analyzing (e.g., in steps S14 and S15 of FIG. 9) the acquired text data in accordance with dictionary data (e.g., information registered in the word dictionary 145 in FIG. 4) for morphologically analyzing the text data; creating (e.g., in step S16 of FIG. 9) morphological analysis information in the form of a table of morphemes constituting the text data, in accordance with results of the analysis; and by use of compound word processing rules (e.g., information shown in FIG. 6 and registered in the compound word processing rule database 149 in FIG. 4) for creating a compound word not registered in the dictionary data, combining the morphemes included in the morphological analysis information into the compound word not registered in the dictionary data and detecting the created compound word (e.g., in steps S18 and S19 of FIG. 9).

An even further embodiment of the present invention is an information processing apparatus for analyzing text data, including: acquisition means (e.g., input section 141 in FIG. 4) for acquiring the text data; morpheme information registration means (e.g., word dictionary 145 in FIG. 4) for registering morpheme information for use in analyzing the text data morphologically; morphological analysis means (e.g., sequential dictionary search section 144 and morpheme candidate selection section 146 in FIG. 4) for analyzing the text data acquired by the acquisition means in accordance with the morpheme information registered by the morpheme information registration means, thereby creating morphological analysis information in the form of a table of morphemes constituting the text data; and segmented morpheme extraction means (e.g., morpheme segmentation section 150 in FIG. 4) for further analyzing the morphemes included in the morphological analysis information created by the morphological analysis means, in accordance with the morpheme information registered in the morpheme information registration means, thereby extracting segmented morphemes from the morphemes.

Figure 10:
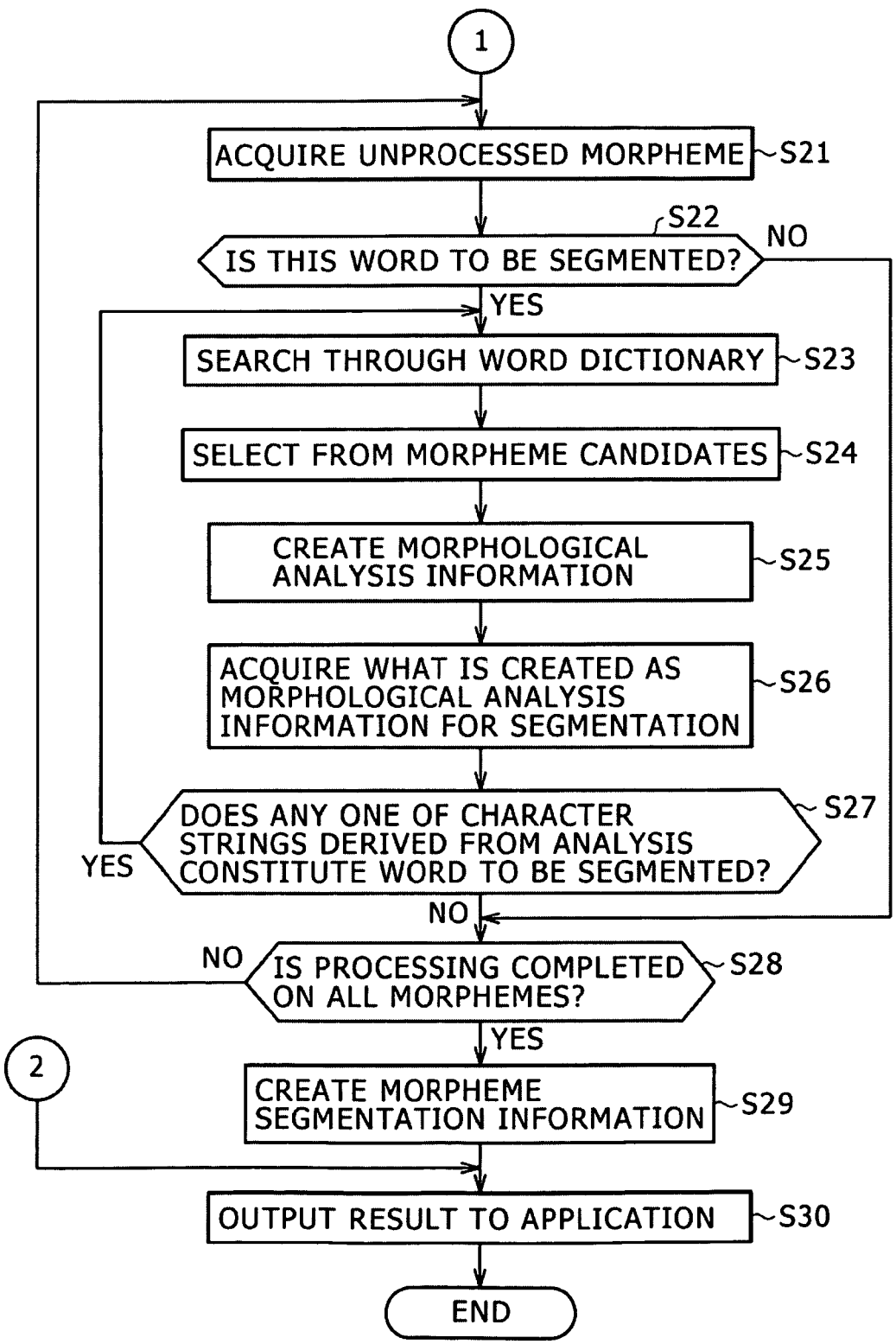
FIG. 10 is a flowchart of further steps in which morphological analysis is performed.

A still further embodiment of the present invention is an information processing method for use with an information processing apparatus for analyzing text data, the information processing method including the steps of: acquiring (e.g., in step S13 of FIG. 9) the text data; analyzing (e.g., in steps S14 and S15 of FIG. 9) the acquired text data in accordance with dictionary data (e.g., information registered in the word dictionary 145 in FIG. 4) for morphologically analyzing the text data; creating (e.g., in step S16 of FIG. 9) morphological analysis information in the form of a table of morphemes constituting the text data in accordance with results of the analysis; and further analyzing the morphemes included in the morphological analysis information in accordance with the dictionary information, thereby extracting segmented morphemes from the morphemes (e.g., in steps S21 to S29 of FIG. 10).

A yet further embodiment of the present invention is a program for causing a computer to carry out a procedure for analyzing text data, the procedure including the steps of: acquiring (e.g., in step S13 of FIG. 9) the text data; analyzing (e.g., in steps S14 and S15 of FIG. 9) the acquired text data in accordance with dictionary data (e.g., information registered in the word dictionary 145 in FIG. 4) for morphologically analyzing the text data; creating (e.g., in step S16 of FIG. 9) morphological analysis information in the form of a table of morphemes constituting the text data in accordance with results of the analysis; and further analyzing the morphemes included in the morphological analysis information in accordance with the dictionary data, thereby extracting segmented morphemes from the morphemes (e.g., in steps S21 to S29 of FIG. 10).

The preferred embodiments of the present invention will now be described below by referring to the accompanying drawings.

Figure 1:
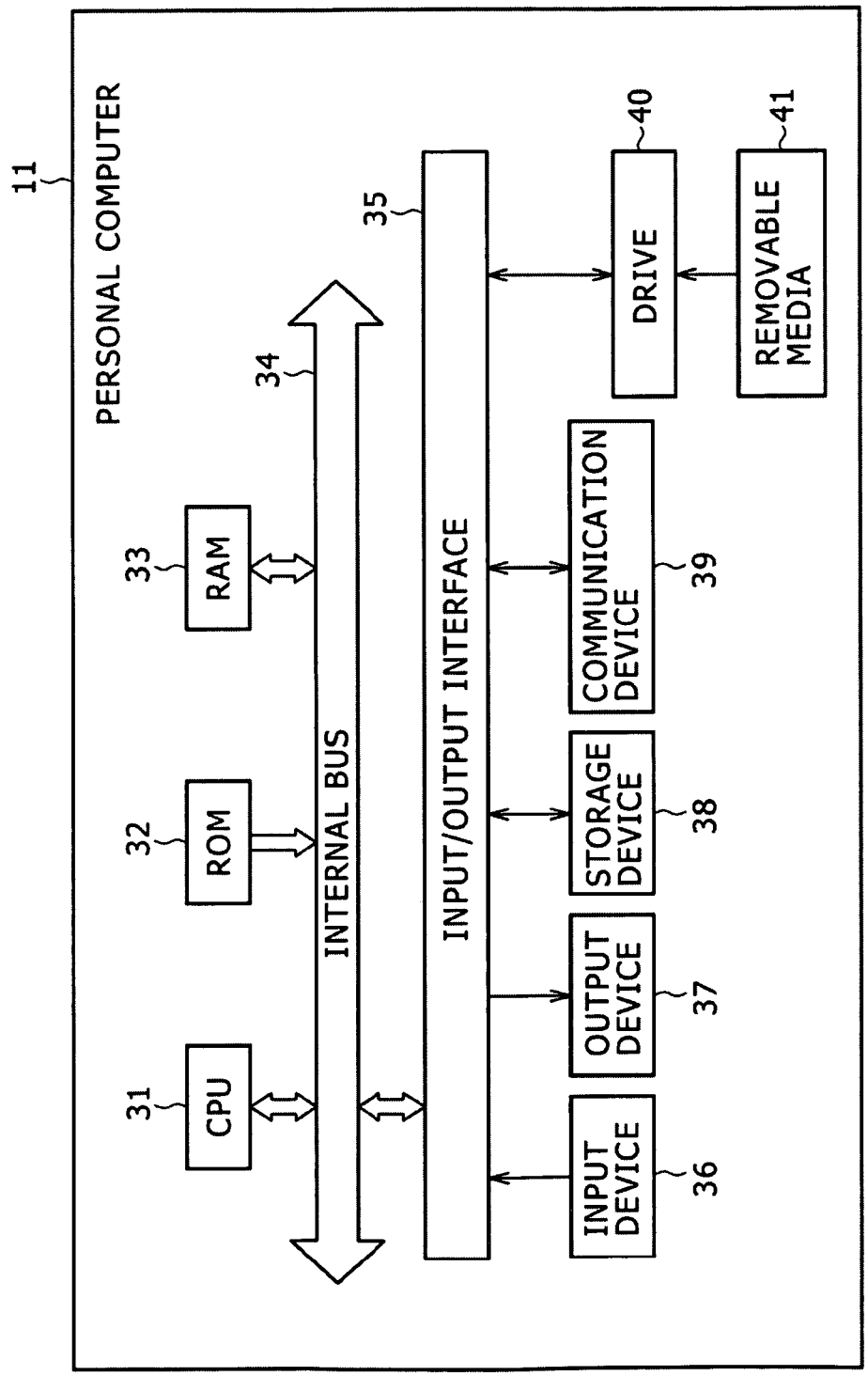
FIG. 1 is a block diagram showing a typical structure of a personal computer.

FIG. 1 is a block diagram of a personal computer 11 as a typical apparatus for implementing the morphological analysis function.

In FIG. 1, a CPU (Central Processing Unit) 31 performs various processes in accordance with the programs held in a ROM (Read Only Memory) 32 or in keeping with the programs loaded from a storage device 38 into a RAM (Random Access Memory) 33. The RAM 33 may accommodate the data necessary for the CPU 31 in carrying out its diverse processing.

The CPU 31, ROM 32, and RAM 33 are interconnected by an internal bus 34. An input/output interface 35 is also connected to the internal bus 34.

The input/output interface 35 is connected to an input device 36, an output device 37, the storage device 38, and a communication device 39. The input device 36 is typically made up of a keyboard and a mouse. The output device 37 is illustratively formed by a display unit such as a CRT or LCD and speakers. The storage device 38 is generally composed of a hard disk drive. The communication device 39 may be constituted by a modem and a terminal adapter. In operation, the communication device 39 conducts communications over networks including telephone lines and the CATV network. The communication device 39 may also be furnished with an antenna for receiving broadcast signals.

A drive 40 may be connected as occasions demand to the input/output interface 35. A piece of removable media 41 such as magnetic disks, optical disks, magneto-optical disks or semiconductor memory may be attached to the drive 40. Computer programs retrieved from the attached piece of removable media 41 may be installed as occasions demand into the storage device 38.

The CPU 31 controls the entire performance of the personal computer 11. For input, the user may perform an operation on the input device 36 such as mouse and keyboard. The user's operation is input to the CPU 31 through the internal bus 34 and input/output interface 35. In response to the input operation, the CPU 31 loads relevant programs from the ROM 32 or storage device 38 into the RAM 33 for program execution, and causes the output device 37 such as display unit and speakers to output the result of the execution. Furthermore, the CPU 31 controls the communication device 39 to communicate and exchange data with external entities.

Figure 2:
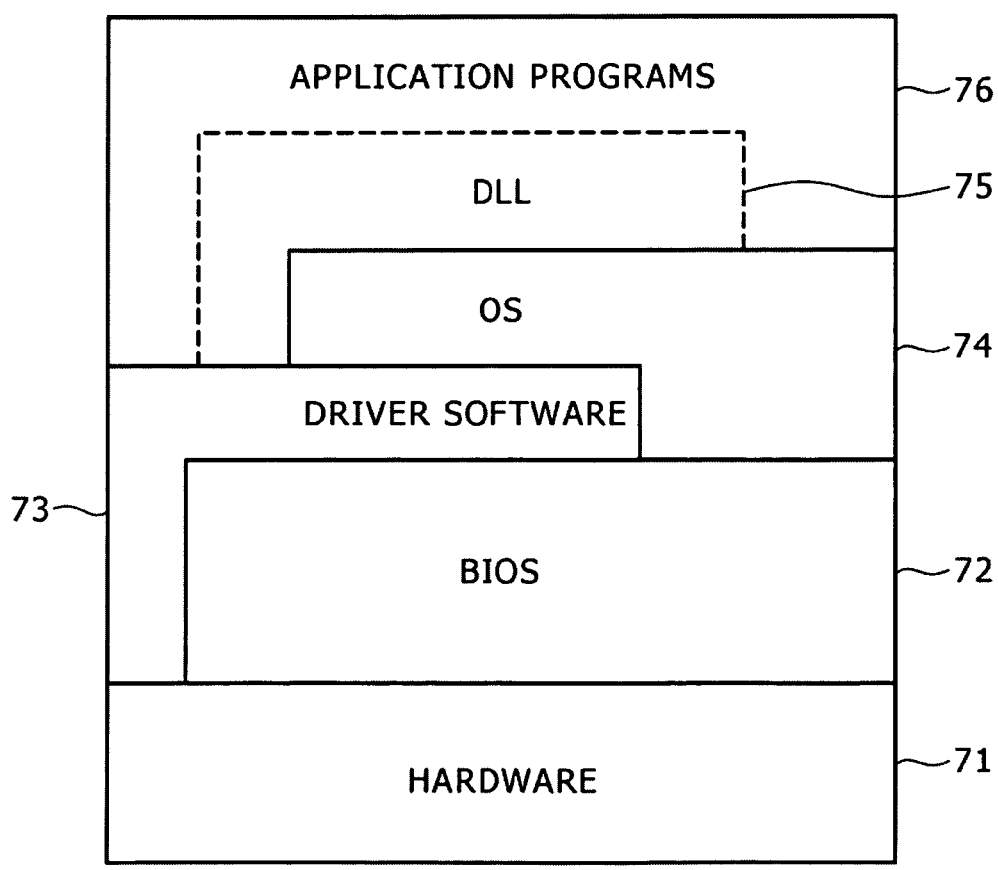
FIG. 2 is a schematic view explanatory of a stack of software executable by the CPU.

FIG. 2 shows how a stack of software executable by the CPU 31 is related to hardware such as the input device 36 (mouse and keyboard), output device 37 (display unit and speakers), and storage device 38 (HDD) which are driven by the software.

Hardware 71 may specifically include such hardware elements as the video board, sound board, or network board for driving the mouse and keyboard making up the input device 36, the display unit and speakers constituting the output device 37, or the HDD as the storage device 38.

A BIOS (basic I/O system) 72 offers capabilities by which an OS 74 and application programs 76 gain access to the devices of the personal computer 11. Also called firmware, the BIOS 72 is distinguished from software.

Driver software 73 is dedicated software for driving the hardware 71. Illustratively, the driver software 73 includes a mouse driver for operating the mouse, a display driver for operating the video card designed to display images on the display unit, and a printer driver for operating a printer, not shown, connected by way of the communication device 39.

The OS 74 controls the basic workings of the personal computer 11 and manages respective resources. For example, the instructions created by application programs 76 are forwarded by the OS 74 to the driver software 73 and BIOS 72. When equipped with multitask and multi-window capabilities, the OS 74 controls the execution context of application programs 76 (e.g., a register set and a main memory image used by a given application program 76 as well as the handling of files thereby) and manages software resources such as GUI parts. Illustratively, the OS 74 may be Windows (registered trademark) 95 (trademark), Windows (registered trademark) 98 (trademark), Windows (registered trademark) NT (trademark), LINUX, or OS/2 (trademark).

A DLL (dynamic link library) 75 is a set of libraries of functions which are necessary for executing software and which constitute standardized independent files. Usually, each of these files is called a DLL. Whereas subroutines are located inside a program, the DLL 75 is distinct in that it is loaded out of the program upon program execution. Windows (registered trademark) offers numerous functions in the form of DLL 75. Because the functions offered as the DLL 75 need not be developed anew, the efficiency in developing application programs 76 is enhanced. Furthermore, since the same program parts can be shared by a plurality of application programs 76, there can be appreciable savings in the disk and memory capacities.

The application programs 76 use the personal computer 11 to accomplish various objectives such as morphological analysis, word processing, spreadsheet handling, database creation, text search, text translation, text-to-speech reading, e-mail exchanges, and web-page browsing.

Figure 3:
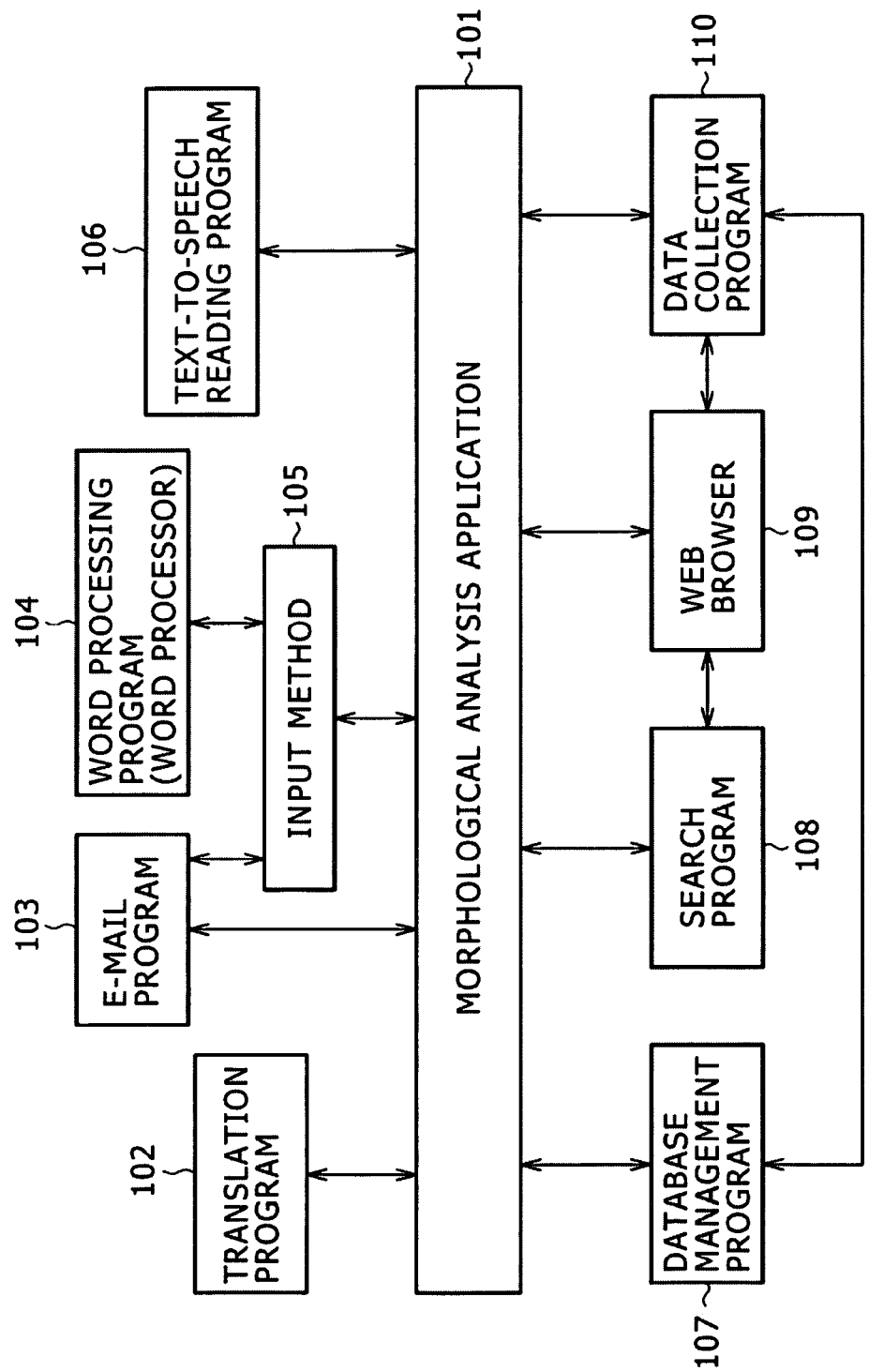
FIG. 3 is a schematic view explanatory of a typical structure of application programs executed by the CPU.

Described below in reference to FIG. 3 is a typical structure of the application programs 76 carried out by the CPU 31.

As shown in FIG. 3, a morphological analysis application 101 is seldom used alone. Typically, the morphological analysis application 101 is used by a translation program 102 for translating text data; by an e-mail program 103 for filtering spam mails; by an input method 105 (e.g., Input Method Editor (IME)), a program that assists the e-mail program 103 or a word processing program 104 in predictive transform during text input; or by a text-to-speech reading program 106 for text analysis.

In addition, the morphological analysis application 101 is used by a database management program 107 in allocating sort keys in a database; or by a search program 108 for text analysts during searches using a specific keyword through database text data (which may or may not be managed by the database management program 107) or through the text data acquired by a web browser 109 or the like over the network. It is preferred that morphological analysis be carried out for "full-text search" whereby all texts in a plurality of documents are searched for the keyword of interest, not just for the "search by file name" or for the "search for character strings inside a file".

Furthermore, the morphological analysis application 101 may be used in conjunction with a data collection program 110. Through the web browser 109, the data collection program 110 searches diverse information over the Internet for specific information using predetermined keywords and arranges the collected information into a database as occasions demand. The morphological analysis application 101 is used to determine whether specific keywords to be collected are included in the information accessed by the data collection program 110 or the like. When filtering contents, the web browser 109 may utilize what is analyzed of the contents by the morphological analysis application 101.

For example, in carrying out an indexed search, the search program 108 searches through a group of target texts beforehand to prepare indexed data in a manner permitting a high-speed search. If the texts are in English in which words are separated from one another by spaces, indexed data may be easily prepared by extracting space-delimited character strings from the texts. In the texts written in Japanese, by contrast, words are not separated from one another by spaces. This makes the search program 108 use the morphological analysis application 101 for analyzing the group of target texts morphologically. The results of the morphological analysis, such as separated words and an analyzed context, are used by the search program 108 as the basis for creating indexed data. The indexed data is in turn used for searches.

Where the results of the morphological analysis done by the morphological analysis application 101 are utilized by the e-mail program 103 for spam mail filtering or by the web browser 109 for content filtering, paragraph analysis and dependency analysis can be performed based on the results of the morphological analysis. This makes it possible to carry out intra-text syntactic analysis for meaning-based filtering, not just for simple pattern matching.

Previously input texts are morphologically analyzed by the morphological analysis application 101 for the word processing program 104 or for the e-mail program 103 whereby a predictive transform function is implemented. Furthermore, received e-mails are morphologically analyzed by the morphological analysis application 101 for use in predictive transform by the e-mail program 103. In this case, the words in the mails can be used predictively for replies.

In the foregoing description made in reference to FIGS. 1 to 3, a plurality of applications including the morphological analysis application 101 were shown to be performed by the CPU 31 of a single personal computer 11. Alternatively, these applications may be carried out synchronously by different CPUs of the same apparatus. As another alternative, the applications may be executed by a plurality of apparatuses (e.g., the morphological analysis application 101 is run by one apparatus while the translation program 102 and search program 108 are by another apparatus, etc.). In the latter case, the results of the execution may be exchanged between the apparatuses by suitable communication arrangements in order to have the processing of the programs synchronized therebetween.

FIG. 4 is a functional block diagram showing functional blocks that are implemented when the morphological analysis application 101 is started and carried out by the CPU 31 as an application program.

An input section 141 receives the input of texts in electronic form and forwards what is received as the input to a morphological analysis section 142.

The morphological analysis section 142 controls the entire processing of morphological analysis. Illustratively, the morphological analysis section 142 supplies a sequential dictionary search section 144 with the text entered through the input section 141 for a search through the dictionary. The morphological analysis section 142 also controls a morpheme candidate selection section 146 to obtain results of basic (i.e., ordinary) morphological analysis; controls a compound word processing section 148 to analyze compound words based on the results of basic morphological analysis; or to control a morpheme segmentation section 150 to further segment the results of basic morphological analysis.

An operation mode setting section 143 sets the operation mode of the morphological analysis application 101. The morphological analysis application 101 has four operation modes: a mode in which to perform basic morphological analysis; a mode in which to analyze compound words in addition to the basic morphological analysis; a mode in which to segment the results of morphological analysis in addition to the basic morphological analysis; and a mode in which both to analyze compound words and to segment the results of morphological analysis in addition to the basic morphological analysis. The operation modes may be differently established beforehand for the different applications which utilize morphological analysis and which were discussed above In reference to FIG. 3. Alternatively, the operation modes may be varied depending on the settings of those applications (including the setting by the user making use of a specific application) which resort to morphological analysis and which were described above by referring to FIG. 3.

Two modes are provided for the morphological analysis controlled by the morphological analysis section 142. In one mode, the compound word processing section 148 analyzes compound words and the morpheme segmentation section 150 segments the results of morphological analysis; in the other mode, the two sections 148 and 150 discontinue their processes. One of the two modes is designated by the application requesting morphological analysis so that the compound word processing section 148 and the morpheme segmentation section 150 may be arranged either to perform or to discontinue their processes.

Under control of the morphological analysis section 142, the sequential dictionary search section 144 references a word dictionary 145 to search the registered words for a match with the input text. The word dictionary 145 contains the registered words to be detected as morphemes. These words include compound words each made up of a plurality of words, such as "stock company" formed by two words "stock" and "company". The words registered as compound words in the word dictionary 145 are associated with information indicating that they constitute compound words, together with such word information as part of speech and reading. The sequential dictionary search section 144 supplies the morpheme candidate selection section 146 with the results of the search performed through the dictionary.

Given the results of the dictionary search, the morpheme candidate selection section 146 selects the character strings deemed suitable as morphemes from the morpheme candidates (i.e., results of the search) using illustratively the longest match principle or cost minimization method, thereby creates morphological analysis information, and forwards the created information to output section 147 and to the morphological analysis section 142. Between compound words and non-compound words, the morpheme candidate selection section 146 selects the compound words preferentially. For example, suppose that analysis of a text "greetings from the president of AAA Stock Company" has revealed the compound word "stock company" being registered in the word dictionary 145. In that case, the morpheme candidate selection section 146 outputs the compound word "stock company" instead of two words "stock" and "company". It should be noted that in morphological analysis, the supplied text is always divided if found divisible before the result is output. Illustratively, if the text "stock company" alone is supplied, then the morpheme candidate selection section 146 selects two words "stock" and "company" as morphemes from the text.

Besides the longest match principle and cost minimization method mentioned above, many other techniques have been proposed for use by the morpheme candidate selection section 146 in selecting the character strings deemed suitable as morphemes from morpheme candidates. Any one of such proposed techniques may be utilized by the morpheme candidate selection section 146.

FIG. 5 shows typical morphological analysis information obtained when the text "greetings from the president of AAA Stock Company" is analyzed.

The morphological analysis information is constituted in part by the character strings of the words selected as morphemes by the morpheme candidate selection section 146 from the result of the search performed through the word dictionary by the sequential dictionary search section 144. The morphological analysis information is further constituted by the parts of speech of the selected words; by the readings of these words; and by information about whether or not these words make up a compound word or words.

Because the compound word "stock company" is found registered in the word dictionary 145, the text "greetings from the president of AAA Stock Company" is morphologically analyzed into the proper noun "AAA," compound word common noun "stock company," common noun "president," particle "of," and sa-row irregular conjugation noun "greetings". The morphological analysis information may illustratively include attribute information about the selected words and their costs. As shown in FIG. 5, of the selected morphemes included in the morphological analysis Information, those constituting compound words are each associated with information indicating that the word in question is a compound word.

In the above example, the compound word "stock company" shown as a typical compound word was made up of two words. Obviously, compound words may also be composed of three or more words each.

The output section 147 outputs the result of the analysis done by the morphological analysis application 101 to the application that requested the morphological analysis earlier. If the morphological analysis application 101 is in an operation mode in which basic morphological analysis alone is carried out, then the output section 147 outputs the morphological analysis information obtained by the morpheme candidate selection section 146. If the morphological analysis application 101 is in an operation mode in which both basic morphological analysis and compound word analysis are carried out, then the output section 147 outputs compound word analysis information acquired by the compound word processing section 148 (to be discussed later) in addition to the morphological analysis information obtained by the morpheme candidate selection section 146. If the morphological analysis application 101 is in an operation mode in which both basic morphological analysis and the segmentation of the result of morphological analysis are carried out, then the output section 147 outputs segmented morpheme information acquired by the morpheme segmentation section 150 (to be discussed later) in addition to the morphological analysis information obtained by the morpheme candidate selection section 146. If the morphological analysis application 101 is in an operation mode in which basic morphological analysis, compound word analysis, and the segmentation of the result of morphological analysis are carried out, then the output section 147 outputs the compound word analysis information acquired by the compound word processing section 148 and the segmented morpheme information gained by the morpheme segmentation section 150 in addition to the morphological analysis information obtained by the morpheme candidate selection section 146.

The compound word processing section 148 obtains morphological analysis information under control of the morphological analysis section 142, and creates compound words from the morphemes making up the morphological analysis information by referencing the compound word processing rules registered in a compound word processing rule database 149, thereby converting the morphological analysis information into compound word analysis information. That is, the compound word processing section 148 detects compound words not registered in the word dictionary 145 through the use of the compound word processing rules found in the compound word processing rule database 149.

FIG. 6 schematically shows typical compound word processing rules registered in the compound word processing rule database 149.

The first rule of the compound word processing rules shown in FIG. 6 states that if an undefined noun appears immediately before the word "stock company," then the two words are to be combined to form a proper noun. The second compound word processing rules states that if an undefined noun appears immediately before the word "president," then the two words are to be combined to form a proper noun. The third compound word processing rules states that if an undefined noun appears immediately before the word "first baseman," then the two words are to be combined to form a proper noun. In stipulating how a compound word is to be processed, each compound word processing rule may state all kinds of information about candidate morphemes including their readings, fonts, and notational lengths in effect as well as notation and part of speech when the morphemes are juxtaposed.

When words are found to constitute a compound word in compliance with the condition of a compound word processing rule, such things as word attribute, reading, and word cost may be defined for the compound word in question in addition to its part of speech. If the condition of a compound word processing rule (left side of an equation in FIG. 6) is met and a compound word is thereby recognized, then that compound word may be subjected to processes such as the above-described definition. Such processes are called action (right side of an equation in FIG. 6).

For example, "river" is pronounced "kawa" when occurring alone but pronounced "gawa" when suffixed onto a proper noun (geographical name in particular). For that reason, a compound word processing rule may be created preferably to include reading-related information defining "(proper noun)+gawa" as a reading.

In FIG. 6, each compound word processing rule is shown to define a compound word made up of two words. Alternatively, compound words may each be constituted by three or more words, and such compound words may be defined similarly using suitable compound word processing rules.

The compound word processing section 148 analyzes the acquired morphological analysis information from the beginning in accordance with the compound word processing rules such as those shown in FIG. 6, registered in the compound word processing rule database 149. Upon detecting part of the acquired information which matches the condition of a compound word processing rule, the compound word processing section 148 performs action on that part and sends the resulting compound word analysis information to the output section 147.

FIG. 7 shows an example of compound word analysis information created by the compound word processing section 148 using the compound word processing rules in FIG. 6, following acquisition of the morphological analysis information made up of the proper noun "AAA," compound word common noun "stock company," common noun "president," particle "of," and sa-row irregular conjugation noun "greetings" derived from the text "greetings from the president of AAA Stock Company".

The nouns "AAA" and "stock company" are first recognized as a compound word "AAA Stock Company" based on the rule "(NOUN, *)(NOUN, "Stock Company")=PROPER NOUN" in FIG. 6. Then in conjunction with the common noun "president," the nouns are recognized altogether as a compound word "president of AAA Stock Company".

Under control of the morphological analysis section 142, the morpheme segmentation section 150 acquires morphological analysis information. If any of the words contained as morphemes in the acquired information is found to be a compound word, then the morpheme segmentation section 150 sends the compound word in question to the morphological analysis section 142 and requests segmentation of the word into morphemes.

The morphological analysis section 142 sends the supplied compound word again to the sequential dictionary search section 144. The sequential dictionary search section 144 is caused to reference the word dictionary 145 for morphological analysis execution and to feed the result of the analysis back to the morpheme segmentation section 150.

Illustratively, suppose that the morpheme segmentation section 150 has acquired morphological analysis information composed of the proper noun "AAA," compound word common noun "stock company," common noun "president," particle "of," and sa-row irregular conjugation noun "greetings" derived from the text "greetings from the president of AAA Stock Company" discussed above in reference to FIG. 5. In that case, the morpheme segmentation section 150 extracts the compound word "stock company" and sends it to the morphological analysis section 142 to request the segmentation of the compound word into morphemes. In turn, the morphological analysis section 142 forwards the compound word "stock company" to the sequential dictionary search section 144.

As described, if the supplied text is found divisible, the sequential dictionary search section 144 during its morphological analysis process always analyzes the text into morphemes and outputs the result of the analysis. If the supplied text to be analyzed is "stock company," then the sequential dictionary search section 144 acquires two words "stock" and "company" from the text and sends the words to the morpheme segmentation section 150 through the morphological analysis section 142.

The morpheme segmentation section 150 retains the supplied result of morphological analysis as the morphological analysis information to be segmented. If any one word of the morphemes included in the morphological analysis information to be segmented turns out to be a compound word, then the morpheme segmentation section 150 feeds the compound word in question again to the morphological analysis section 142 to request the segmentation of the compound word into morphemes. The above processes are repeated by the morphological analysis section 142 and by the sequential dictionary search section 144.

If no further compound word is found in the morphological analysis information to be segmented, then the morpheme segmentation section 150 sends the segmented morphemes to the output section 147 as segmented morpheme information.

After acquiring the morphological analysis information composed of the proper noun "AAA," compound word common noun "stock company," common noun "president," particle "of," and sa-row irregular conjugation noun "greetings" derived from the text "greetings from the president of AAA Stock Company" discussed above in reference to FIG. 5, the morpheme segmentation section 150 eventually obtains the segmented morpheme information made up of the proper noun "AAA," common noun "stock," common noun "company," common noun "president," particle "of," and sa-row irregular conjugation noun "greetings" as shown in FIG. 8.

In determining whether or not to segment a word, the morpheme segmentation section 150 may check to determine if the number of the characters in the word is at least three, in addition to verifying the morphological analysis information indicating a compound word. Such a condition for use in the check is desirable for detailed word segmentation.

Alternatively, the morpheme segmentation section 150 may determine whether or not to perform word segmentation based on part of speech. More specifically, many compound word nouns are each formed by the combination of nouns. As a result, if the part of speech turns out to be a noun, then the segmentation of the word in question into morphemes is deemed highly significant; it is also highly probable for the application that requested morphological analysis to significantly utilize the segmented morpheme information. By contrast, if the part of speech is a verb, there still exist compound words such as "to send" and "to start". However, the segmentation of the word in question into morphemes is not deemed so significant; the possibility of the word being highly valued by the application is not very high. If the part of speech is an adjective, there exist some compound words such as "in a quick manner" and "beautiful," the segmentation of the word into morphemes is even less significant than the verb. The possibility of the word being valued by the application is lower than the case of the verb. If the part of speech is an adverb, then the segmentation of the word in question into morphemes is far less significant; the possibility of the word being valued by the application is lower still.

One of the diverse applications which utilize morphological analysis and which were discussed above in reference to FIG. 3 may determine beforehand whether the morpheme segmentation section 150 is to perform morphological segmentation on nouns alone; on nouns and verbs; on nouns, verbs and adjectives; or on nouns, verb, adjective and adverbs. Such settings may later be changed by one of the applications which utilize morphological analysis and which were described above in reference to FIG. 3 (the change may include the settings made by the user who uses a particular application).

Where the morpheme segmentation section 150 performs morphological segmentation in recursive fashion, the results of a plurality of passes of the morphological segmentation may all be included in the segmented morpheme information.

For example, suppose that a compound word "International BBB Association's World Cup Championship Series"; BBB is the name of a sport such as soccer or basketball) is registered in the word dictionary 145 for use as a registered compound word. In such a case, upon encountering this compound word, the morpheme segmentation section 150 supplies the word in question to the morphological analysis section 142 to get results therefrom. The morpheme segmentation section 150 proceeds to carry out morphological segmentation in a recursive manner. Illustratively, in a first step, the morpheme segmentation section 150 may acquire "International BBB Association's World Cup" and "International Championship Series". In a second step, the morpheme segmentation section 150 may segment "International BBB Association's World Cup" into "International BBB Association" and "World Cup"; and "world championship series" into "world," "championship," and "series". In a third step, the morpheme segmentation section 150 may segment "International BBB Association" into "international," "BBB," and "association"; "world cup" into "world"; and "cup"; and "athlete series" into "athlete" and "series".

In the above example, the words "International BBB Association's World Cup" and "International Championship Series" are recorded in the first step as the result of segmentation. In the second step, the words "International BBB Association," "world cup," "world," "championship," and "series" are recorded as the result of segmentation. In the third step, the words "international," "BBB," "association," "world," "cup," "world," "athlete," "series," and "series" are recorded as the result of segmentation (it should be noted that "world" and "series" were already acquired in the second step).

The processing of morphological analysis will now be described in reference to the flowcharts of FIGS. 9 and 10.

In step S11, the operation mode setting section 143 checks to determine whether the setting of an operation mode or any change of the current mode is designated on the basis of the type and operational settings of the application that requested the morphological analysis application 101 to carry out the processing.

If in step S11 the setting of an operation mode or a change of the current mode is found designated, then step S12 is reached. In step S12, the operation mode setting section 143 sets the operation mode or changes the current mode as designated for the morphological analysis application 101 controlled by the morphological analysis section 142.

More specifically, the operation mode setting section 143 sets one of four operation modes for the morphological analysis application 101: an operation mode in which basic morphological analysis alone is performed; an operation mode in which both basic morphological analysis and compound word analysis are carried out; an operation mode in which both basic morphological analysis and the segmentation of the result of morphological analysis are executed; and an operation mode in which basic morphological analysis, compound word analysis, and the segmentation of the result of morphological analysis are conducted.

Step S13 is reached in one of two cases: if in step S11 neither the setting of an operation mode or the change to the current mode is found designated; and when the execution of step S12 is completed. In step S13, the input section 141 receives input of the text to be analyzed from one of the applications which requested the morphological analysis application 101 to carry out morphological analysis as discussed above in reference to FIG. 3. The input text is forwarded to the morphological analysis section 142.

In step S14, the morphological analysis section 142 sends the supplied text to the sequential dictionary search section 144. Under control of the morphological analysis section 142, the sequential dictionary search section 144 references the word dictionary 145 and searches through the registered words for matches with the input text. The result of the search through the dictionary is sent by the sequential dictionary search section 144 to the morpheme candidate selection section 146.

In step S15, the morpheme candidate selection section 146 receives the result of the dictionary search (i.e., morpheme candidates) and selects the character strings suitable as morphemes from the search result illustratively by use of the longest match principle or cost minimization method.

In step S16, based on the morpheme candidates selected in step S15, the morpheme candidate selection section 146 creates the morphological analysis information such as that discussed above in reference to FIG. 5. The created information is sent by the morpheme candidate selection section 146 to the output section 147 and to the morphological analysis section 142.

In step S17, the morphological analysis section 142 checks to determine whether the operation mode set by the operation mode setting section 143 is one in which compound word analysis is performed. If in step S17 the operation mode is not found to be one in which compound word analysis is carried out, then control is passed on to step S20 (to be discussed later).

If in step S17 the operation mode is found to be one in which compound word analysis is performed, then step S18 is reached. In step S18, the morphological analysis section 142 supplies the morphological analysis information to the compound word processing section 148. The compound word processing section 148 references the compound word processing rules such as those registered in the compound word processing rule database 149 and discussed above in reference to FIG. 6.

In step S19, on the basis of the compound word processing rules registered in the compound word processing rule database 149, the compound word processing section 148 combines the morphemes included in the morphological analysis information into compound word analysis information such as that described above in reference to FIG. 7. The information thus created is supplied to the output section 147.

Step S20 is reached if in step S17 the operation mode is not found to be one in which compound word analysis is carried out, or upon completion of the execution of step S19. In step S20, the morphological analysis section 142 checks to determine whether the operation mode set by the operation mode setting section 143 is one in which morpheme segmentation is conducted. If in step S20 the operation mode is not found to be one in which morpheme segmentation is carried out, then control is passed on to step S30 (to be discussed later).

If in step S20 the operation mode is found to be one in which morpheme segmentation is performed, then step S21 is reached. In step S21, the morphological analysis section 142 supplies the morphological analysis information to the morpheme segmentation section 150. The morpheme segmentation section 150 acquires unprocessed morphemes from the supplied morphological analysis information.

In step S22, the morpheme segmentation section 150 checks to determine whether an acquired morpheme is a compound word or whether the acquired morpheme is a word to be segmented based on the number of the characters in that word or according to the part of speech of the word in question. If in step S22 the acquired morpheme is not found to be a word to be segmented, then control is passed on to step S28 (to be discussed later).

If in step S22 the acquired morpheme is found to be a word to be segmented, then step S23 is reached. In step S23, the morpheme segmentation section 150 supplies the word of interest to the morphological analysis section 142 and requests segmentation of the word into morphemes. The morphological analysis section 142 sends the supplied compound word again to the sequential dictionary search section 144. The sequential dictionary search section 144 searches through the word dictionary 145 and supplies the result of the dictionary search to the morpheme candidate selection section 146.

In step S24, the morpheme candidate selection section 146 receives the result of the dictionary search (i.e., morpheme candidates) and selects the character strings suitable as morphemes from the morpheme candidates illustratively through the use of the longest match principle or cost minimization method.

In step S25, based on the morpheme candidates selected in step S24, the morpheme candidate selection section 146 creates morphological analysis information such as that discussed above in reference to FIG. 5 and sends the created information to the morphological analysis section 142. The morphological analysis section 142 forwards the supplied morphological analysis information to the morpheme segmentation section 150.

In step S26, the morpheme segmentation section 150 acquires and retains the supplied morphological analysis information as the morphological analysis information for segmentation.

In step S27, the morpheme segmentation section 150 checks to determine whether any one of the character strings held as the morphological analysis information for segmentation (i.e., character strings derived from the analysis) is a word to be segmented. In this step, the morpheme segmentation section 150 also checks to determine whether the acquired character string is a compound word or whether the character string in question is a word to be segmented based on the number of the characters in the character string or according to the part of speech of that character string.

If in step S27 any one of the character strings acquired from the analysis is found to be a word to be segmented, then control is returned to step S23 and the subsequent steps are repeated.

Step S28 is reached if in step S22 the acquired morpheme is not found to be a word to be segmented or if in step S27 none of the character strings is found to be a word to be segmented. In step S28, the morpheme segmentation section 150 checks to determine whether the processing has been carried out on all morphemes. If in step S28 the processing is not found to have been performed on all morphemes, then control is returned to step S21 and the subsequent steps are repeated.

If in step S28 the processing is found to have been completed on all morphemes, then step S29 is reached. In step S29, the morpheme segmentation section 150 creates segmented morpheme information such as what was discussed above in reference to FIG. 8 and supplies the created information to the output section 147.

Step S30 is reached if in step S20 the operation mode is not found to be one in which morpheme segmentation is performed, or upon completion of the execution of step S29. In step S30, the output section 147 outputs the analysis results acquired through the processing of the morphological analysis application 101 to the application that requested the morphological analysis. This completes the processing.

Through the processing discussed above, if the operation mode of the morphological analysis application 101 is one in which basic morphological analysis alone is performed, then the application 101 can supply the application that requested the morphological analysis with the morphological analysis information acquired by the morpheme candidate selection section 146. If the operation mode of the morphological analysis application 101 is one in which both basic morphological analysis and compound word analysis are carried out, then the application 101 can supply the application that requested the morphological analysis with the compound word analysis information obtained by the compound word processing section 148 in addition to the morphological analysis information acquired by the morpheme candidate selection section 146.

If the operation mode of the morphological analysis application 101 is one in which both basic morphological analysis and the segmentation of the result of morphological analysis are executed, then the application 101 can supply the application that requested the morphological analysis with the segmented morpheme information obtained by the morpheme segmentation section 150 in addition to the morphological analysis information acquired by the morpheme candidate selection section 146. If the operation mode of the morphological analysis application 101 is one in which basic morphological analysis, compound word analysis, and the segmentation of the result of morphological analysis are conducted, then the application 101 can supply the application that requested the morphological analysis with the compound word analysis information gained by the compound word processing section 148 and the segmented morpheme information obtained by the morpheme segmentation section 150 in addition to the morphological analysis information acquired by the morpheme candidate selection section 146.

In traditional morphological analysis, no compound words other than those registered in the word dictionary 145 could be extracted. According to the present embodiment, by contrast, compound word analysis is carried out on the basis of compound word processing rules so that compound words not registered in the word dictionary 145 may also be extracted. In ordinary morphological analysis, the elements (i.e., words) making up any compound word could not be extracted once registered in the word dictionary 145. According to the present embodiment, by contrast, the elements constituting any registered compound word may be extracted through the segmentation process.

That is, implementation of the present invention makes it possible to supplement the result of usual morphological analysis with compound word analysis information and segmented morpheme information. The results of these analyses may be applied to a wide range of applications such as translation and search applications, whereby significant benefits are obtained.

It will be appreciated that the use or nonuse of the present invention distinctly affects the result of the processing by the translation program 102. More specifically, the translation program 102 may translate the text "greetings from the president of AAA Stock Company" into "president of AAA Stock Company," "of," and "greetings" in one case; into "AAA Stock Company," "president," "of," and "greetings" in another case; or into "AAA," "stock company president," "of," and "greetings" in yet another case, depending on whether or not to have recourse to the present invention.

Suppose also that the word "International BBB Association's World Cup Championship Series" is input as a search key and that the search using this word comes up with few items of worthwhile information. In such a case, the words or word strings constituting the target word are usually employed for further searches. However, where a search can be made in units of the compound words registered beforehand in the word dictionary 145, the accuracy of the search is dependent on the number of words and their patterns registered in the word dictionary 145. If the shorted possible segments words are presented to the application or to the user for searches using words or word strings optimally fit for obtaining the desired result, then the accuracy of the search is dramatically improved. Where the morpheme segmentation section 150 performs morpheme segmentation in recursive fashion, the results of a plurality of passes of the morphological segmentation may all be included in the segmented morpheme information. This makes it possible easily to extract the words or word strings that are best fit for acquisition of desired search results.

With the inventive structure in place, compound words may be registered in the word dictionary 145 without the user being aware of the unit words constituting these compound words; the results of searches through the dictionary are still the same as those given when individual words are registered as the elements constituting the compound words. This helps enhance the efficiency of dictionary maintenance.

Illustratively, if at least two words "stock" and "company" are registered and if the proper noun "AAA" is an undefined word not found in the dictionary, then the above-described text "AAA stock company" may be morphologically analyzed into a compound word "AAA stock company" (proper noun) and into segmented information made up of "AAA" (proper noun), "stock" (common noun), and "company" (common noun). If the word dictionary 145 contains a registered common word "stock company," then this word is also acquired as part of the morphological analysis information.

In other words, the compound word "AAA Stock Company" (proper noun), without being registered in the word dictionary 145, can be obtained as a compound word proper noun. Since it is possible to extract such combinations of different proper nouns as "CCC stock company" and "DDD stock company," numerous compound words can be extracted without an increase in the word count of the word dictionary 145.

The present invention is obviously applicable to languages other than Japanese. For example, the word dictionary may be arranged to contain registered English words such as "united," "America," "president," "airline" and "state"; articles such as "a," "an" and "the"; prepositions such as "in," "of" and "at"; compound words such as "The United States of America"; and compound word processing rules such as (NOUN "president") OF (NOUN (name of country), *)=PROPER NAME, and (NOUN, *)(NOUN "airline")=PROPER NOUN. In such a case, the same type of processing discussed above may be carried out to detect unregistered compound words "President of The United States of America" and "United Airlines" as well as to detect the unit words constituting the compound word "The United States of America."

The series of the steps or processes described above may be executed either by hardware or by software. For the software-based processing to take place, the programs constituting the software may be either incorporated beforehand in dedicated hardware of a computer for program execution or installed upon use from a suitable recording medium into a general-purpose personal computer or like equipment capable of executing diverse functions based on the installed programs.

As shown in FIG. 1, the recording medium which is offered to users apart from their computers and which accommodates the programs designed to perform the above-described series of steps and processes is typically constituted by the removable media 41 such as magnetic disks (including flexible disks), optical disks (including CD-ROM (Compact Disk Read-Only Memory) and DVD (Digital Versatile Disk)), magneto-optical disks (including MD (Mini-Disk; registered trademark)), or semiconductor memories.

In this specification, the steps describing the programs stored on the recording medium represent not only the processes that are to be carried out in the depicted sequence (i.e., on a time series basis) but also processes that may be performed parallelly or individually and not chronologically.

In this specification, the term "system" refers to an entire configuration made up of a plurality of component devices or apparatuses.

It should be understood by those skilled in the art that various modifications, combinations, sub-combinations and alterations may occur depending on design requirements and other factor in so far as they are within the scope of the appended claims or the equivalents thereof.

What is claimed is:

1. An information processing apparatus for analyzing text data, comprising:
   acquisition means for acquiring said text data;
   morpheme information registration means for registering morpheme information for use in analyzing said text data morphologically;
   morphological analysis means for analyzing said text data acquired by said acquisition means in accordance with said morpheme information registered by said morpheme information registration means, and creating morphological analysis information in the form of a table of morphemes constituting said text data, the morphological analysis means having a plurality of operation modes including a basic morphological analysis mode, a compound word analysis mode in addition to the basic morphological analysis mode, a segment mode for segmenting results of the morphological analysis information in addition to the basic morphological analysis mode, and the compound word analysis mode with the segment mode in addition to the basic morphological analysis mode;
   compound word processing rule registration means for registering compound word processing rules for creating a compound word not registered in said morpheme information registration means; and
   compound word processing means, by use of said compound word processing rules registered in said compound word processing rule registration means, for combining said morphemes included in said morphological analysis information created by said morphological analysis means, into said compound word not registered in said morpheme information registration means and detecting the created compound word,
   wherein said compound word processing rules registered in said compound word processing rule registration means include descriptions for furnishing the compound word combined from a plurality of words with at least one of information items made up of word attribute, reading, and word cost in addition to its part of speech.

2. The information processing apparatus according to claim 1, wherein said compound word processing rules registered in said compound word processing rule registration means designate conditions for the words to be included in the compound word combined from a plurality of adjacent words.

3. The information processing apparatus according to claim 1, further comprising output means for outputting said morphological analysis information created by said morphological analysis means, as well as said compound word detected by said compound word processing means.

4. The information processing apparatus according to claim 1, further comprising segmented morpheme extraction means for further analyzing said morphemes included in said morphological analysis information created by said morphological analysis means in accordance with said morpheme information registered in said morpheme information registration means, and extracting segmented morphemes from said morphemes.

5. The information processing apparatus according to claim 4, further comprising output means for outputting said morphological analysis information created by said morphological analysis means, said compound word detected by said compound word processing means, and said segmented morphemes extracted by said segmented morpheme extraction means.

6. The information processing apparatus according to claim 4, wherein said morpheme information registered in said morpheme information registration means includes information about whether a morpheme of interest is a compound word;
   said morphological analysis means incorporates, in said morphological analysis information, information about whether each of the morphemes constituting said text data in the form of a table in said morphological analysis information is registered as a compound word in said morpheme information registration means; and
   said segmented morpheme extraction means extracts said segmented morphemes constituting the morpheme of interest if said morpheme is found registered as a compound word in said morpheme information registration means upon reference to said morphological analysis information.

7. An information processing method for use with an information processing apparatus for analyzing text data, said information processing method comprising the steps of:
   acquiring said text data;
   analyzing the acquired text data in accordance with dictionary data for morphologically analyzing said text data;
   creating, using the information processing apparatus, morphological analysis information in the form of a table of morphemes constituting said text data, in accordance with results of said analysis, said analysis being performed by a morphological analysis means having a plurality of operation modes including a basic morphological analysis mode, a compound word analysis mode in addition to the basic morphological analysis mode, a segment mode for segmenting results of the morphological analysis information in addition to the basic morphological analysis mode, and the compound word analysis mode with the segment mode in addition to the basic morphological analysis mode; and by use of compound word processing rules for creating a compound word not registered in said dictionary data, combining said morphemes included in said morphological analysis information into said compound word not registered in said dictionary data and detecting the created compound word, wherein said compound word processing rules include descriptions for furnishing the compound word combined from a plurality of words with at least one of information items made up of word attribute, reading, and word cost in addition to its part of speech.

8. A computer program comprising programming instructions stored in a non-transitory computer readable medium, wherein the computer program, when executed on a computer controls the computer to carry out a procedure for analyzing text data, said procedure comprising the steps of:

acquiring said text data;

analyzing the acquired text data in accordance with dictionary data for morphologically analyzing said text data;

creating morphological analysis information in the form of a table of morphemes constituting said text data, in accordance with results of said analysis, said analysis being performed by a morphological analysis means having a plurality of operation modes including a basic morphological analysis mode, a compound word analysis mode in addition to the basic morphological analysis mode, a segment mode for segmenting results of the morphological analysis information in addition to the basic morphological analysis mode, and the compound word analysis mode with the segment mode in addition to the basic morphological analysis mode; and by use of compound word processing rules for creating a compound word not registered in said dictionary data, combining said morphemes included in said morphological analysis information into said compound word not registered in said dictionary data and detecting the created compound word, wherein said compound word processing rules include descriptions for furnishing the compound word combined from a plurality of words with at least one of information items made up of word attribute, reading, and word cost in addition to its part of speech.

9. An information processing apparatus for analyzing text data, comprising:

acquisition means for acquiring said text data;

morpheme information registration means for registering morpheme information for use in analyzing said text data morphologically;

morphological analysis means for analyzing said text data acquired by said acquisition means in accordance with said morpheme information registered by said morpheme information registration means, and creating morphological analysis information in the form of a table of morphemes constituting said text data, the morphological analysis means having a plurality of operation modes including a basic morphological analysis mode, a compound word analysis mode in addition to the basic morphological analysis mode, a segment mode for segmenting results of the morphological analysis information in addition to the basic morphological analysis mode, and the compound word analysis mode with the segment mode in addition to the basic morphological analysis mode;

segmented morpheme extraction means for further analyzing said morphemes included in said morphological analysis information created by said morphological analysis means, in accordance with said morpheme information registered in said morpheme information registration means, and extracting segmented morphemes from said morphemes; and compound word processing rule registration means for registering compound word processing rules for creating a compound word not registered in said morpheme information registration means, wherein said compound word processing rules include descriptions for furnishing the compound word combined from a plurality of words with at least one of information items made up of word attribute, reading, and word cost in addition to its part of speech.

10. An information processing method for use with an information processing apparatus for analyzing text data, said information processing method comprising the steps of:

acquiring said text data;

analyzing the acquired text data in accordance with dictionary data for morphologically analyzing said text data;

registering morpheme information for use in analyzing said text data morphologically;

creating, using the information processing apparatus, morphological analysis information in the form of a table of morphemes constituting said text data in accordance with results of said analysis, said analysis being performed by a morphological analysis means having a plurality of operation modes including a basic morphological analysis mode, a compound word analysis mode in addition to the basic morphological analysis mode, a segment mode for segmenting results of the morphological analysis information in addition to the basic morphological analysis mode, and the compound word analysis mode with the segment mode in addition to the basic morphological analysis mode;

further analyzing said morphemes included in said morphological analysis information in accordance with said dictionary information, and extracting segmented morphemes from said morphemes; and registering compound word processing rules for creating a compound word not registered, wherein said compound word processing rules include descriptions for furnishing, the compound word combined from a plurality of words with at least one of information items made up of word attribute, reading, and word cost in addition to its part of speech.

11. A computer program comprising programming instructions stored in a non-transitory computer readable medium, wherein the computer program, when executed on a computer controls the computer to carry out a procedure for analyzing text data, said procedure comprising the steps of:

acquiring said text data;

analyzing the acquired text data in accordance with dictionary data for morphologically analyzing said text data;

registering morpheme information for use in analyzing said text data morphologically;

creating morphological analysis information in the form of a table of morphemes constituting said text data in accordance with results of said analysis, said analysis being performed by a morphological analysis means having a plurality of operation modes including a basic morphological analysis mode, a compound word analysis mode in addition to the basic morphological analysis mode, a segment mode for segmenting results of the morphological analysis information in addition to the basic morphological analysis mode, and the compound word analysis mode with the segment mode in addition to the basic morphological analysis mode;

further analyzing said morphemes included in said morphological analysis information in accordance with said dictionary information, and extracting segmented morphemes from said morphemes; and registering compound word processing rules for creating a compound word not registered, wherein said compound word processing rules include descriptions for furnishing the compound word combined from a plurality of words with at least one of information items made up of word attribute, reading, and word cost in addition to its part of speech.

12. A non-transitory recording medium which records the program according to claim 8 or 11.

13. An information processing apparatus for analyzing text data, comprising:

an acquisition section configured to acquire said text data;

a morpheme information registration section configured to register morpheme information for use in analyzing said text data morphologically;

a morphological analysis section configured to analyze said text data acquired by said acquisition section in accordance with said morpheme information registered by said morpheme information registration section, and creates morphological analysis information in the form of a table of morphemes constituting said text data, the morphological analysis section having a plurality of operation modes including a basic morphological analysis mode, a compound word analysis mode in addition to the basic morphological analysis mode, a segment mode for segmenting results of the morphological analysis information in addition to the basic morphological analysis mode, and the compound word analysis mode with the segment mode in addition to the basic morphological analysis mode;

a compound word processing rule registration section configured to register compound word processing rules for creating a compound word not registered in said morpheme information registration section; and a compound word processing section configured such that by use of said compound word processing rules registered in said compound word processing rule registration section, said compound word processing section combines said morphemes included in said morphological analysis information created by said morphological analysis section, into said compound word not registered in said morpheme information registration section and detects the created compound word, wherein said compound word processing rules include descriptions for furnishing the compound word combined from a plurality of words with at least one of information items made up of word attribute, reading, and word cost in addition to its part of speech.

14. An information processing apparatus for analyzing text data, comprising:

an acquisition section configured to acquire said text data;

a morpheme information registration section configured to register morpheme information for use in analyzing said text data morphologically;

a morphological analysis section configured to analyze said text data acquired by said acquisition section in accordance with said morpheme information registered by said morpheme information registration section, and creates morphological analysis information in the form of a table of morphemes constituting said text data, the morphological analysis section having a plurality of operation modes including a basic morphological analysis mode, a compound word analysis mode in addition to the basic morphological analysis mode, a segment mode for segmenting results of the morphological analysis information in addition to the basic morphological analysis mode, and the compound word analysis mode with the segment mode in addition to the basic morphological analysis mode;

a segmented morpheme extraction section configured to further analyze said morphemes included in said morphological analysis information created by said morphological analysis section, in accordance with said morpheme information registered in said morpheme information registration section, and extracts segmented morphemes from said morphemes; and a compound word processing rule registration section configured to register compound word processing rules for creating a compound word not registered in said morpheme information registration section, wherein said compound word processing rules include descriptions for furnishing the compound word combined from a plurality of words with at least one of information items made up of word attribute, reading, and word cost in addition to its part of speech.

* * * * *